United States Patent
Michiels et al.

(10) Patent No.: US 9,338,145 B2
(45) Date of Patent: May 10, 2016

(54) SECURITY PATCH WITHOUT CHANGING THE KEY

(71) Applicant: NXP B.V., Eindhoven (NL)

(72) Inventors: Wil Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 43 days.

(21) Appl. No.: 14/263,308

(22) Filed: Apr. 28, 2014

(65) Prior Publication Data

US 2015/0312225 A1  Oct. 29, 2015

(51) Int. Cl.
*G06F 21/16* (2013.01)
*H04L 29/06* (2006.01)

(52) U.S. Cl.
CPC ............ *H04L 63/0428* (2013.01); *G06F 21/16* (2013.01); *H04L 63/062* (2013.01)

(58) Field of Classification Search
None
See application file for complete search history.

(56) References Cited

U.S. PATENT DOCUMENTS

| | | | |
|---|---|---|---|
| 7,350,085 B2 * | 3/2008 | Johnson et al. | 713/193 |
| 2004/0139340 A1 | 7/2004 | Johnson et al. | |
| 2007/0014394 A1 | 1/2007 | Harder et al. | |
| 2010/0299515 A1 | 11/2010 | Michiels et al. | |
| 2012/0170740 A1 * | 7/2012 | Lee et al. | 380/44 |
| 2013/0276019 A1 * | 10/2013 | Liu | 725/31 |

OTHER PUBLICATIONS

"Syncrosoft MCFACT—Secure Data Processing Technology", Re-trust Sixth Quarterly Meeting, Mar. 11, 2008, Villach, Austria, 108 pages.
Chow, Stanley et al., "A White-Box DES Implementation for DRM Applications", Digital Rights Management: ACM CCS-9 Workshop, DRM 2002, Washington, D.C., USA, Nov. 18, 2002, 1-16.
Chow, Stanley et al., "White-Box Cryptography and an AES Implementation", Cryptography: 9th Annual International Workshop, SAC 2002, St. John's, Newfoundland, Canada, Aug. 15, 2002.
European Search Report for EP 15165325 dated Sep. 30, 2015.

* cited by examiner

*Primary Examiner* — David Pearson (57) ABSTRACT

A method of patching a cryptographic implementation without changing a key in a cryptographic system, including: sending a message from a first message set to the cryptographic implementation, wherein the first message uses a first portion of the cryptographic implementation; deciding to patch the cryptographic implementation; sending a second message from a second message set to the cryptographic implementation after deciding to patch the cryptographic implementation, wherein the second message use a second portion of the cryptographic implementation that is not used for any messages in the first message set.

34 Claims, 4 Drawing Sheets

SECURITY PATCH WITHOUT CHANGING THE KEY

TECHNICAL FIELD

Various exemplary embodiments disclosed herein relate generally to patching a security patch in a white-box implementation without changing a cryptographic key.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of patching a cryptographic implementation without changing a key in a cryptographic system, including: sending a message from a first message set to the cryptographic implementation, wherein the first message uses a first portion of the cryptographic implementation; deciding to patch the cryptographic implementation; sending a second message from a second message set to the cryptographic implementation after deciding to patch the cryptographic implementation, wherein the second message use a second portion of the cryptographic implementation that is not used for any messages in the first message set.

Various embodiments are described wherein the first message uses the first portion of the cryptographic implementation that is not used for any messages not in the first message set and wherein the second message uses the second portion of the cryptographic implementation that is not used for any messages not in the second message set.

Various embodiments are described wherein messages from the second message set may use any portion of the first portion of the cryptographic implementation.

Various embodiments are described further including updating the cryptographic implementation with the second portion of the cryptographic implementation after deciding to patch the cryptographic implementation.

Various embodiments are described further including continuing to send messages from the first message set after deciding to patch the cryptographic implementation.

Various embodiments are described wherein deciding to patch the cryptographic implementation further includes receiving an indication that the cryptographic implementation has been copied.

Various embodiments are described wherein deciding to patch the cryptographic implementation occurs after a time period has expired.

Various embodiments are described wherein the cryptographic implementation includes a network of finite state machines.

Various embodiments are described wherein the cryptographic implementation includes a network of lookup tables.

Various embodiments are described wherein the cryptographic operation is one of advanced encryption system (AES) or data encryption standard (DES).

Further, various exemplary embodiments relate to a method of producing a cryptographic implementation of a keyed cryptographic operation mapping an input message to an output message in a cryptographic system, wherein the cryptographic implementation is patchable without changing the cryptographic key, including: receiving information specifying a plurality of message groups; modifying the cryptographic implementation based upon the received information specifying the plurality of message groups so that: when a message from a first message set is received by the cryptographic implementation, the first message uses a first portion of the cryptographic implementation; when a second message from a second message set is received the cryptographic implementation after deciding to patch the cryptographic implementation, the second message uses a second portion of the cryptographic implementation that is not used for any messages in the first message set.

Various embodiments are described wherein the first message uses the first portion of the cryptographic implementation that is not used for any messages not in the first message set and wherein the second message uses the second portion of the cryptographic implementation that is not used for any messages not in the second message set.

Various embodiments are described wherein messages from the second message set may use any portion of the first portion of the cryptographic implementation.

Various embodiments are described wherein the cryptographic implementation is further modified to process messages from a first message group associated with a first portion of the cryptographic implementation, and the cryptographic implementation is configured to receive a second portion of the cryptographic implementation before messages from a second message group associated with the second portion of the cryptographic implementation are received.

Various embodiments are described wherein cryptographic implementation includes a plurality of functions, and modifying the cryptographic implementation so that: the output of a first function includes an indication that the input to the first function corresponds to a received input message that is in one of the plurality of the message groups; and based upon an indication that the input to the first function does correspond to a message in one of the plurality of the groups, using only a portion of a second function that corresponds to the message group associated the received input message.

Various embodiments are described wherein the cryptographic implementation includes a network of finite state machines.

Various embodiments are described wherein the cryptographic implementation includes a network of lookup tables.

Various embodiments are described wherein the cryptographic operation is one of advanced encryption system (AES) or data encryption standard (DES).

Further, various exemplary embodiments relate to a method of mapping an input message to an output message in a cryptographic implementation of a keyed cryptographic operation in a cryptographic system, wherein the cryptographic implementation is patchable without changing the cryptographic key, including: receiving, by the cryptographic system, a first input message associated with a first message set, wherein the first message set is associated with a first portion of the cryptographic implementation; performing, by the cryptographic system, a keyed cryptographic operation mapping the first input message into a first output message, wherein the performing the mapping on the first input message uses the first portion of the cryptographic implementation; receiving, by the cryptographic system, a second input message associated with a second message set, wherein the second message set is associated with a second portion of the cryptographic implementation; performing, by the cryptographic system, a keyed cryptographic operation mapping the second input message into a second output message, wherein the performing the mapping on the second input message uses the second portion of the cryptographic implementation that is not used for any messages in the first message set.

Various embodiments are described wherein the first input message uses the first portion of the cryptographic implementation that is not used for any input messages not in the first message set and wherein the second input message uses the second portion of the cryptographic implementation that is not used for any input messages not in the second message set.

Various embodiments are described wherein input messages from the second message set may use any portion of the first portion of the cryptographic implementation.

Various embodiments are described further including before receiving the second input message receiving a second portion of the cryptographic implementation.

Various embodiments are described wherein the cryptographic implementation includes a plurality of functions, the output of a first function includes an indication that the input to the first function corresponds to a received second input message that is in the second message group, and based upon an indication that the input to the first function does correspond to a received second input message in the second message group, using only a portion of a second function that corresponds to the second message group.

Various embodiments are described wherein the cryptographic implementation includes a network of finite state machines.

Various embodiments are described wherein the cryptographic implementation includes a network of lookup tables.

Various embodiments are described wherein the cryptographic operation is one of advanced encryption system (AES) or data encryption standard (DES).

Further, various exemplary embodiments relate to a non-transitory machine-readable storage medium encoded with instructions for execution by a cryptographic implementation of a keyed cryptographic operation in a cryptographic system for mapping an input message to an output message, wherein the cryptographic implementation is patchable without changing the cryptographic key, the non-transitory machine-readable storage medium including: instructions for receiving a first input message associated with a first message set, wherein the first message set is associated with a first portion of the cryptographic implementation; instructions for performing a keyed cryptographic operation mapping the first input message into a first output message, wherein performing the mapping on the first input message uses the first portion of the cryptographic implementation; instructions for receiving a second input message associated with a second message set, wherein the second message set is associated with a second portion of the cryptographic implementation; instructions for performing a keyed cryptographic operation mapping the second input message into a second output message, wherein the performing the mapping on the second input message uses the second portion of the cryptographic implementation that is not used for any messages in the first message set.

Various embodiments are described wherein the first input message uses the first portion of the cryptographic implementation that is not used for any input messages not in the first message set and wherein the second input message uses the second portion of the cryptographic implementation that is not used for any input messages not in the second message set.

Various embodiments are described wherein input messages from the second message set may use any portion of the first portion of the cryptographic implementation.

Various embodiments are described further including instructions for receiving a second portion of the cryptographic implementation before receiving the second input message.

Various embodiments are described wherein the cryptographic implementation includes a plurality of functions, the output of a first function includes an indication that the input to the first function corresponds to a received second input message that is in the second message group, and based upon an indication that the input to the first function does correspond to a received second input message in the second message group, using only a portion of a second function that corresponds to the second message group.

Various embodiments are described wherein the cryptographic implementation includes a network of finite state machines.

Various embodiments are described wherein the cryptographic implementation includes a network of lookup tables.

Various embodiments are described wherein the cryptographic operation is one of advanced encryption system (AES) or data encryption standard (DES).

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

The discussion below is directed to white-box cryptography because it is the most challenging attack model. Further, many cryptographic implementations are deployed and used in an environment where they are subject to a white-box attack. There is also a black-box attack model and a grey-box attack model. In the black-box attack model, it is assumed that the attacker only has access to the input and output of the implementation. In the grey-box attack model, it is assumed, that in addition the access to the input and the output of the implementation, that the attacker has access to side channel information regarding the execution of the implementation. Such side channel information may include power, timing, electronic emissions, etc. Accordingly, the benefits of the embodiments described below may be used to prevent any of these various levels of attack as well as others that may be defined. Therefore, where white-box implementations are described, it is intended that they may include black-box implementations as well as grey-box implementations that use the various methods described in the embodiments below.

Implementing security in software instead of hardware has several advantages. One of them is renewability. This means that if an implemented security mechanism has become inadequate due to malicious attacks, then it may be patched via a software update. Although a software patch is relatively low cost when compared to a hardware patch, it is still desirable to keep the number of software updates small. A first reason is that patching still induces cost because patching a software solution typically requires changes in all nodes of a networked system. Second, frequent software updates may annoy the user. Third, security patches typically require the replacement of cryptographic keys. Therefore, if the replacement is done quickly, devices will stop working until a software patch is installed. A more gradual replacement is more complex and is in contradiction with the goal of repairing the security vulnerabilities as soon as possible.

A common goal of a malicious user is to illegitimately distribute a cryptographic key to other users. This goal may be hard to achieve for white-box implementations as they are designed to hide the cryptographic key. However, it may be sufficient for an adversary to distribute a complete white-box implementation by code lifting. That is, instead of extracting and distributing the cryptographic key, an attacker distributes a functionality of the key. The idea of the embodiments described herein is to make so-called k-refreshable white-box implementations for some given k. If a white-box implementation is 'refreshed', the same underlying cryptographic key is kept and used, but instead a part of the white-box implementation is used that was not used before. In this way, an adversary has to restart his task of isolating a white-box implementation and his efforts of circumventing possible platform binding mechanisms that are included in the white-box implementation.

In order to demonstrate embodiments of the invention, an example white-box implementation of AES will now be described. White-box cryptography is the discipline of implementing a cryptographic algorithm in software such that it is difficult for an attacker to find the key. Hereby, the strongest conceivable (but for software most realistic) attack model is assumed in which the adversary is assumed to have full control over and full access to the white-box implementation.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The white-box implementation may be implemented using a plurality of basic blocks. The plurality of basic blocks is interconnected, in the sense that some of the blocks build on the outputs of one or more of the previous blocks. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a obfuscating input encoding and a output encodings. The results of applying a obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. In other embodiments, the key may include dynamic keys that, for example, take implicit key information and combine it with some sort of dynamic information to produce the key used in the cryptographic function. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with this invention.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depends on the key size. Each round includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function.

Figure 1:
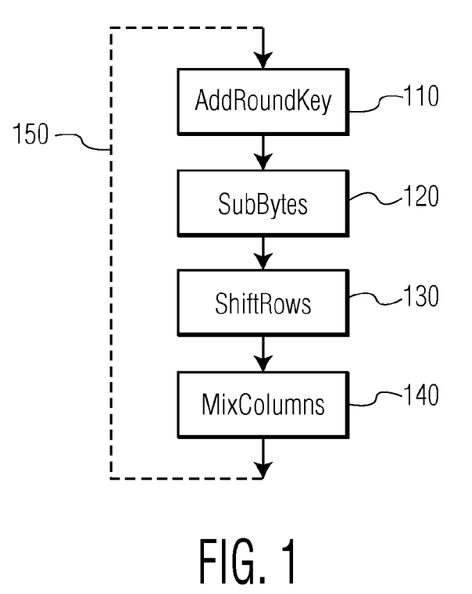
FIG. 1 illustrates the main steps of a round of AES.

FIG. 1 illustrates some main processing steps of a round of AES. The processing steps include:

AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in $GF(2^8)$.

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
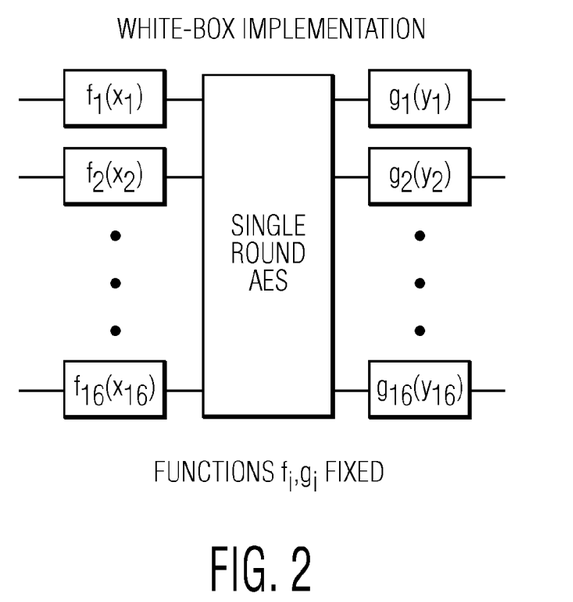
FIG. 2 illustrates a white-box AES implementation with encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j} \oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte $z_{i,j}$ of the round is computed from the 4 output bytes $y_{1,j}, y_{2,j}, y_{3,j}$, and $y_{4,j}$ via the algebraic expression $z_{l,j}=MC_{l,1} \cdot y_{1,j} \oplus MC_{l,2} \cdot y_{2,j} \oplus MC_{l,3} \cdot y_{3,j} \oplus MC_{l,4} \cdot y_{4,j}$ in $GF(2^8)$ for some constants $MC_{l,r}$.

Now define a lookup table for each byte-to-byte function $Q_{i,j,l}(x_{i,j})=MC_{l,i} \cdot T_{i,j}(x_{i,j})$ with i, j, l=1, 2, . . . , 16. Then any output byte $z_{l,j}$ may be computed by XORing the results of these lookup tables, i.e., $z_{l,j}=Q_{1,j,l}(x_{1,j}) \oplus Q_{2,j,l}(x_{2,j}) \oplus Q_{3,j,l}(x_{3,j}) \oplus Q_{4,j,l}(x_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
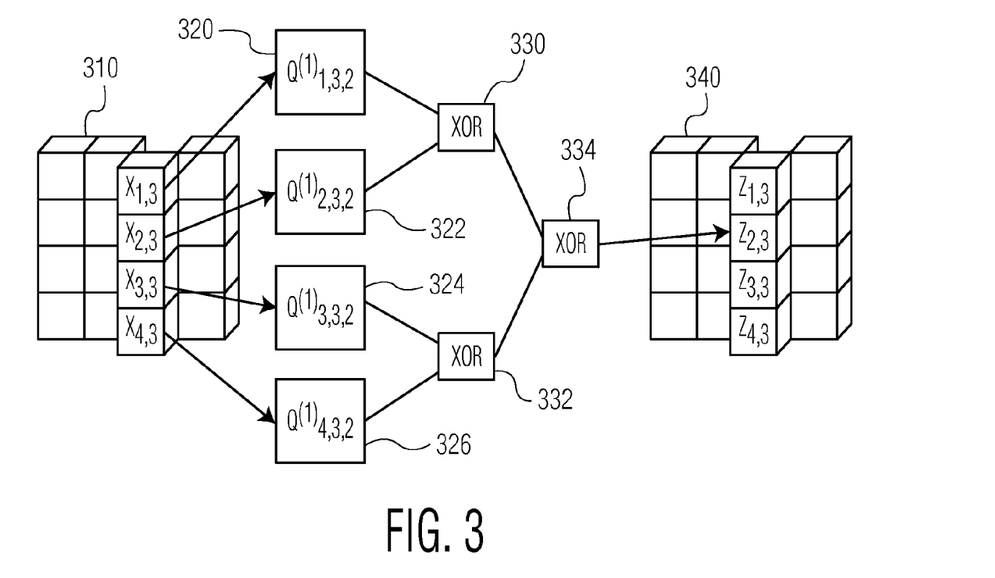
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}, x_{2,3}, x_{3,3}$, and $x_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
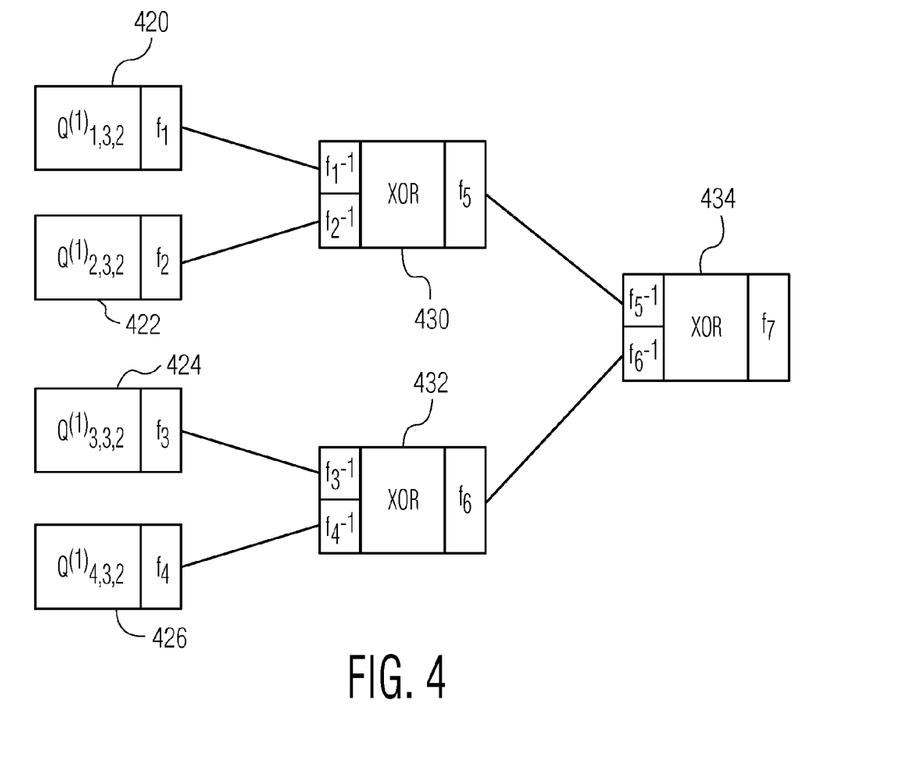
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

The description of the table lookup based white-box implementation described above was for the encryption operation of AES. It is noted that the above description is easily adapted for the decryption operation by using the inverse of the SubBytes, ShiftRows, and MixColumns operations (invSubBytes, invShitftrow, and invMixColumns). Accordingly, it is assumed that the description above can be used for either the encryption or decryption operation of AES as needed in the embodiments below.

An essential feature of embodiments of the invention described herein is the use of k-refreshable white-box implementations to recover from illegitimate distribution. A k-refreshable white-box implementation is a white-box implementation together with k+1 subsets $M_0, M_1, M_2, \ldots, M_k$ of the message space, such that the following is true. Let WB(m) be the part of the white-box implementation that is used for message m. Similarly, define $WB(M_i)$ as the part of the white-box implementation that is used for the messages from $M_i$, i.e., $WB(M_i) = U_{m \in M_i} WB(m)$. Then for any $m \in M_i$, if the white-box implementation is run on m, it uses a part of the white-box implementation that is not used for any of the messages from $M_0, \ldots, M_{i-1}$. Formally, this means: $WB(m) \backslash U_{j<i} WB(M_j) \neq \emptyset$. A k-refreshable white-box implementation may be used as follows. Initially, messages are taken from $M_0$. Alternatively, messages may be taken from $M_0$ with a high probability. After refreshing the white-box implementation for the $i^{th}$ time, $i=1, 2, \ldots, k$, messages are taken (or as before with very high probability) from $U_{j \leq i} M_j$ and with considerable probability (e.g., 20% or even 100%) from $M_i$. In one embodiment, all portions of the white-box implementation may be available to the user. In other embodiments, the portion of the white-box implementation associated with the refresh may be provided at the time the refresh is made.

Note that this gives the renewal-behavior mentioned above. If a white-box implementation is "refreshed", the same underlying cryptographic key is used, but a part of the white-box implementation is used that was not used before. In this way, an adversary has to restart the process of isolating a white-box implementation and of circumventing possible platform binding mechanisms that are included in the white-box implementation.

In one embodiment, $M_0, \ldots, M_k$ are defined such that if random messages are generated, they are with very small probability in $M_1, \ldots, M_k$. This is to prevent an attacker from isolating a white-box implementation based on self-generated random messages.

The embodiments described herein may be applied to any white-box implementation, i.e., an obfuscated implementation of a cryptographic algorithm. The most popular white-box implementations are table-based white-box implementations as described above for example in Chow 1 and Chow 2.

A first embodiment will be described using a table base AES white-box decryption implementation. As described above, AES operates on data blocks of 16 bytes. These are written as a 4×4 byte matrix, called the state. A round of AES consists of the following operations: AddRoundKey, InvSubBytes, InvShiftRows, and invMixColumns. The 10th and last round consists of only the operations AddRoundKey, InvSubBytes, InvShiftRows, AddRoundKey. For this embodiment, the following aspects of the white-box implementation of Chow 1 are considered, where, the external encodings are omitted.

The last round only includes an input-encoded 8-to-8 bit lookup table for each of the 16 bytes of the input-state. These 16 lookup tables merge the operations AddRoundKey, InvSubBytes, and AddRoundKey. More formally, this means the following, where for ease of presentation the InvShiftRows operation of the last round is ignored as this is simply a renumbering of the indices. Let for each byte $x_{i,j}$ of the state the byte-to-byte function $T_{i,j}$ be defined by $T_{i,j}(x_{i,j}) = k_{i,j}^{11} \oplus S^{-1}(x_{i,j} \oplus k_{i,j}^{10})$. Then, the last round of the white-box implementation of Chow 1 contains 16 byte-to-byte lookup tables that implement the function $T_{i,j} \circ f_{i,j}^{-1}$, where $f_{i,j}$ is a randomly chosen bijective function. The function $f_{i,j}$ is added to encode the input of $T_{i,j}$. Input and output encodings are put on lookup tables in such a way that the output encoding of one table matches the input encoding assumed in the next tables.

With this information, the first embodiment may now be described. Let k=15 and define $M_i$ with $i=0, 1, \ldots, 15$ as the set of plaintext messages for which the last nibble gives the binary representation of the value i. Note that each set includes $2^{124}$ messages. This white-box implementation and these sets of messages define a k-refreshable white-box implementation.

This first embodiment of the k-refreshable white-box implementation may be used in the following way. Initially, messages are taken from $M_0$. This means that initially all message end with (i.e., are padded with) the value 0000. Consequently the lookup table $T_{4,4} \circ f_{4,4}^{-1}$ for the last byte of the computed 16-byte result is only accessed for those rows that end with the value 0000. Suppose now that a malicious user has illegitimately distributed the implementation on the Internet. Then, messages can be padded with 0001 instead of 0000. This implies that the lookup table $T_{4,4} \circ f_{4,4}^{-1}$ is accessed at positions where it has not been accessed before. If the malicious user has isolated the white-box implementation by observing its execution using messages from $M_0$, then it is likely that the malicious user did not copy these table entries. This is especially the case if the lookup table $T_{4,4} \circ f_{4,4}^{-1}$ is spread out over the memory instead of being stored as $2^8$ consecutive bytes in memory. A way to implement this is as follows. During the production of the white-box implementation, consider a row r of $T_{4,4} \circ f_{4,4}^{-1}$ with byte value $b_r$. Then we may search in memory for the value $b_r$ (for instance in a code fragment) and reference to this value for example using a pointer. Alternatively, the value $b_r$ may also be found as some platform characteristic.

In the above embodiment, k=15 and the white-box implementation may be refreshed when the white-box implementation has been copied and used without authorization. Alternatively, the white-box implementation may be refreshed on a regular basis, for example, once per month. Further, after refreshing, messages may be taken from both $M_0$ and $M_1$. As a result, messages from $M_0$ may be processed correctly in a copied white-box implementation, but messages from $M_1$ will not be processed correctly.

A disadvantage of the above embodiment is that an adversary can identify all table accesses by running the white-box implementation on a large set of random messages since a message is in a set $M_i$ with a probability of $\frac{1}{16}$. An improved embodiment may be obtained if $M_i$ is specified by a longer binary string. If the binary string is for instance more than 60 bits, the proposed attack is no longer feasible. A disadvantage of this larger padding string is that there is less room for the real message. This problem may be alleviated by not taking all messages from $M_i$ after the $i^{th}$ renewal, but once in a while or for certain purposes (e.g., only for authentication).

In a second embodiment, a larger bit string may be used to pad the message in order to specify the different message groups $M_i$. In order to describe this embodiment the simplified version of the white-box implementation of Chow 1 described above will be used. Further, it is assumed that there are no external encodings. Furthermore, a modified AES version is used in which the last 2 rounds (i.e., rounds 9 and 10) do not have a InvShiftRows operation because including this operation complicates the discussion considerably so for ease of describing the embodiment it is not included. In practice the InvShiftRows operations can be accommodated.

As in the previous embodiment, let k=15. However, the sets $M_i$ are chosen differently. Define $M_i$ with i=0, 1, . . . , 15 as the set of plaintext messages for which the last 2 columns in the state array are all zeros and the last nibble of the $2^{nd}$ column is the binary representation of the value i. Note that each set includes $2^{60}$ messages. It is noted that this specific determination of the message sets is only an example to be used to illustrate the operation of an embodiment of a method for patching the white-box implementation without changing the key. Other various criteria may be used to define the various sets of messages $M_i$. Also, any number of sets may be selected, and any number of messages may be in each set.

It is now the goal to modify the white-box implementation such that for each set $M_i$, a part of the white-box implementation may be indentified that is only accessed for the messages from $M_i$ and not for any other messages. If this is accomplished, a k-refreshable white-box implementation results. Furthermore, this embodiment has the additional property that an attacker can no longer locate the complete white-box implementation by running it on a large set of random messages, as was possible in the previous embodiment. After all, the probability that a random message is in the set $M_i$ is only $2^{-68}$.

A white-box implementation with secure patching without changing the key may be implemented by extending the table network of FIG. 3. Further, the white-box implementation may be further modified by applying encodings in the same way as illustrated in FIG. 4. In this embodiment only the last 2 rounds of the table network are modified, i.e., rounds 9 and 10. It is possible to modify other rounds, but rounds 9 and 10 are used for ease in illustrating the operation of the embodiment. First, consider round 9 depicted in FIG. 3. For each $M_i$, it holds that all their messages have 8 zero-bytes in the last two columns. Because a variant of AES is assumed in which Rounds 9 and 10 do not have the InvShiftRows operation, the last two columns of the output are derived from the last two columns $x_3, x_4$ of the input state x to round 9. Let $X_3, X_4$ be the 32-bit values that result in an output of the white-box implementation that has 8 zero-bytes in the last 2 columns, when the last 2 columns $x_3, x_4$ of the input state x to round 9 are $X_3, X_4$. The values $X_3, X_4$ are uniquely defined.

Figure 5:
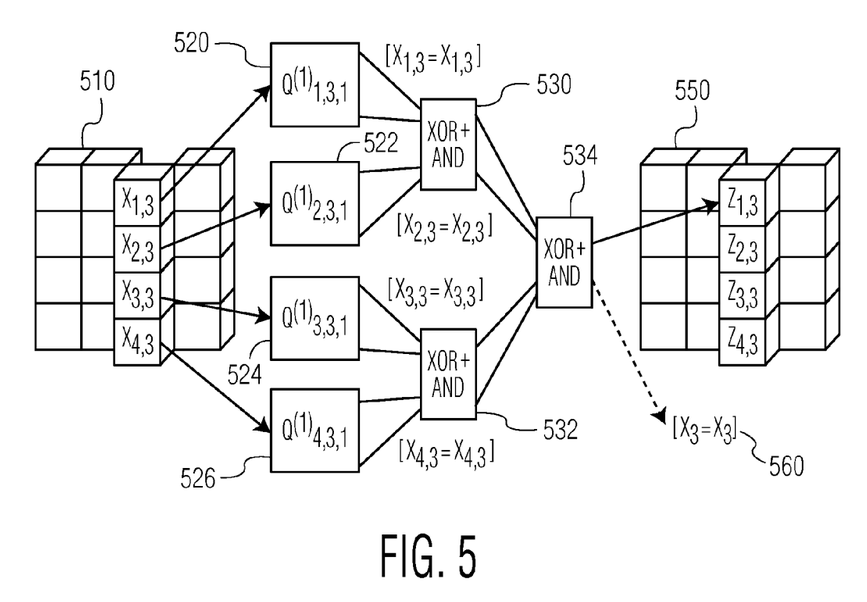
FIG. 5 illustrates an embodiment of a white-box implementation that implements a security patch that is an extension of the white-box implementation illustrated in FIG. 3.

FIG. 5 illustrates an embodiment of a white-box implementation that implements a security patch that is an extension of the white-box implementation illustrated in FIG. 3. Let bytes $\tilde{z}_{1,3}$ and $\tilde{z}_{1,4}$ be the first bytes of the last two columns of output state $\tilde{z}$ 550. Now, for the computations of the first nibble of $\tilde{z}_{1,3}$ and $\tilde{z}_{1,4}$ the following extension is described. First, the output of each Q-table $Q^{(1)}_{i,j,1}$ 520, 522, 524, 526 may be extended by 1 bit. This means that the Q-table becomes a 8-to-5-bit lookup table. The extra bit indicates whether or not $x_{i,j}$ equals $X_{i,j}$.

Furthermore, the XOR-tables 530, 532 succeeding the Q-tables 520, 522, 524, 526 are extended to a 10-to-5 bit table, such that, besides the original XOR operation, the Q-tables 520, 522, 524, 526 also compute the AND of the newly introduced bits of both input arguments. The same is done for the last XOR-table 534 which outputs the byte $\tilde{z}_{1,3}$ as well as a bit that indicates whether $x_3 = X_3$ 560. The same process may be used to calculate the $\tilde{z}_{1,4}$ as well as a bit that indicates whether $x_4 = X_4$. As a result of the extensions, not only are bytes $\tilde{z}_{1,3}$ and $\tilde{z}_{1,4}$ computed, but also two Boolean values that indicate whether $x_3 = X_3$ and $x_4 = X_4$.

Figure 6:
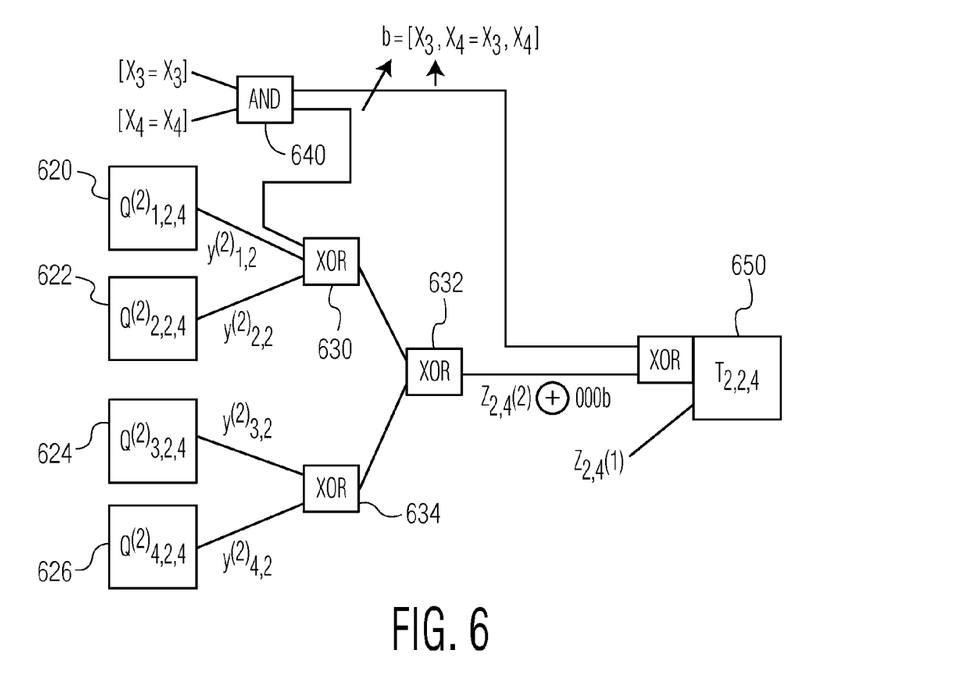
FIG. 6 illustrates a portion of round 9 of the embodiment of the white-box implementation that calculates the second nibble of the output byte $\tilde{z}_{2,4}$.

FIG. 6 illustrates a portion of round 9 of the embodiment of the white-box implementation that calculates the second nibble of the output byte $\tilde{z}_{2,4}$. Q-boxes 620, 622, 624, 626 like those described above are used with XORs 630, 632, 634 to calculate the second nibble of the output byte $\tilde{z}_{2,4}$. Further two Boolean values indicating whether $x_3 = X_3$ and $x_4 = X_4$ are input into a lookup table 640. The lookup table 640 may calculate the AND of these two Boolean values indicating whether $x_3 = X_3$ and $x_4 = X_4$ resulting in a Boolean value b that is 1 if and only if $(x_3, x_4) = (X_3, X_4)$. The Boolean value b may be used in the computation of the second nibble of $\tilde{z}_{2,4}$, where is the output state of round 9. That is, the Boolean value b is used in the computation of the last byte of the second column of $\tilde{z}$, whose values help define the message sets $M_i$.

Let $y^{(2)}_{i,j}$ be the output of the Q-tables 620, 622, 624, 626 for computing $\tilde{z}_{2,4}$. Then, the 8-to-4 bit XOR-table 630 that XORs the first two outputs $y^{(2)}_{1,2}$ and $y^{(2)}_{2,2}$ may be extended to a 9-to-4 bit XOR table that has b as an additional third argument. The new XOR tables computes $y^{(2)}_{1,2} \oplus y^{(2)}_{2,2} \oplus 000b$. After performing another XOR 632 the result may be input to a T-table 650 of round 10. Note that, as explained in the first embodiment, the last round starts with T-tables instead of Q-tables, i.e., it does not have an invMixColumn operation. Originally in the white-box implementation of FIGS. 3 and 4, the T-table of the last round was an 8-to-8-bit lookup tables with input arguments nibbles $\tilde{z}^{(1)}_{2,4}$ and $\tilde{z}^{(2)}_{2,4}$. In FIG. 6, this T-table 650 may be modified in order to remove the dependency on b. This may be done by transforming the table into a 9-to-8 bit lookup table, which merges the original T-box operation with a XOR-operation) on $z^{(2)}_{2,4} \oplus 000b$ and 000b in order to obtain the proper input $\tilde{z}^{(2)}_{2,4}$. Now k-refreshable white-box implementation may be completed by applying encoding functions as is done in FIG. 4.

As stated above, it was a goal to have a white-box implementation with the property that for each set $M_i$ a part of the white-box implementation may be identified that is only accessed for the messages from $M_i$ and not for any other messages. The white-box implementation of the embodiment in FIGS. 5 and 6 has this property. In the modified T-table 650 of FIG. 6, the rows associated with b=1 (i.e., in the described embodiment when the last 8 bytes of the message $M_i$ are all 0) and which end with the binary representation of i are accessed for messages from $M_i$ and not for other messages. Note that in this embodiment these are 16 entries.

This embodiment may be extended to a larger number of message sets $M_i$ (i.e., k), by using more bits in the messages $M_i$. Further, the number of messages in each set of messages $M_i$ may be varied according the number of bits used to identify the sets.

If an adversary runs the white-box implementation on a message from $M_i$ without having the $M_i$-specific part of the white-box implementation, then the adversary may still finish the execution successfully by guessing the missing values. In both embodiments presented, this gives the adversary the major part of the correct result, even in case of incorrect guessing. The reason is that the $M_i$-specific part in the computation is restricted to the computation of a single output byte α, which contains an encoding of i in its second nibble. So, only 1 nibble of real information is lost. The number of bits used for i may be extended to make it harder for an adversary to guess the missing parts. The use of 4 bits for i was used for ease in the description.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

In addition to the computer program being implemented on a non-transitory computer readable medium, such computer program may be transmitted to a user or user device for installation and use. This may be done over any communication network, for example, the internet.

Further, user devices implementing the embodiments described herein may include, smart cards, payment cards, transit cards, access cards and devices, mobile phones, tablets, personal digital assistants, portable and desktop computers, set-top boxes, digital video records, media streaming devices, etc. Uses of the embodiments described above may include payment software, security access, parking access, transit access and payments, banking, software and digital media transmission, secure communications, content distribution, etc.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

Figure 7:
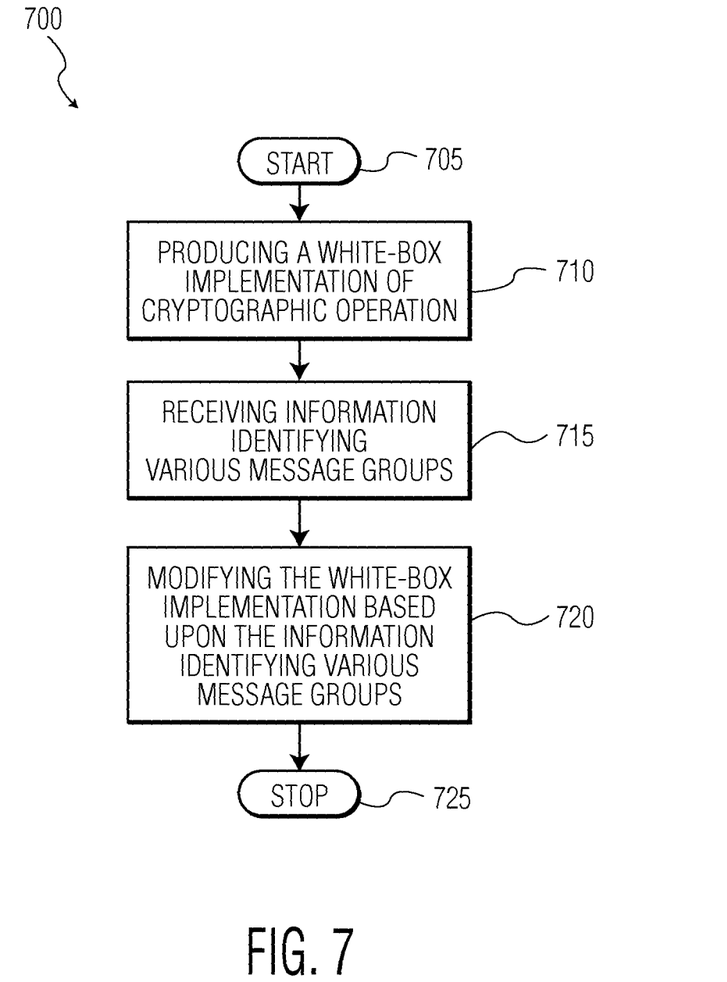
FIG. 7 is a flow chart illustrating a method of producing a white-box implementation that may be securely patched.

FIG. 7 is a flow chart illustrating a method of producing a white-box implementation that may be securely patched. First, the method begins 705. Then, a white-box implementation of the cryptographic operation is produced 710. This may be produced as described above using various methods and implementations. Next, information identifying the various message groups is received 715. As described above a group of messages sets $M_1, \ldots M_k$ may be defined that are used to convey information that is processed by the white-box implementation. The identifying information may be carried in the last nibble of the input messages m, dividing the complete message space into 16 groups as described above. In another embodiment described above, the total message set is described as including those messages with the last 8 bytes being all 0's out of a 16 byte message. Further the last nibble of the $8^{th}$ byte may be used to define 16 groups among the complete set of messages. Other ways of defining the message groups may be used as well. Then, the white-box implementation may be modified based upon the identifying information 720 so that: when an input message m is in a message group $M_i$, that there is a part of the white-box implementation associated with the message group $M_i$ that is only used to process the message m and not messages from other message groups.

Alternatively, the white-box implementation may be modified based upon the identifying information so that: when an input message m is in an input group $M_i$, that there is a part of the white-box implementation associated with the message group $M_i$ that is only used to process the message m and not messages from the groups $M_0 \ldots M_{i-1}$. Further, the message m may use any part of groups $M_0 \ldots M_{i-1}$. This allows for a patch using a new message group $M_i$ to use a new part of the white-box implementation over groups $M_0 \ldots M_{i-1}$, and the message m may use parts of the group $M_0 \ldots M_i$ that were previously only used by that group when it was the newly patched portion of the white-box implementation. The various embodiments discussed above provide different ways in which this capability may be implemented in the white-box implementation. The method may then end 725.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of patching a cryptographic implementation without changing a key in a cryptographic system, comprising:
   sending a message from a first message set to the cryptographic implementation, wherein the first message uses a first portion of the cryptographic implementation;
   deciding to patch the cryptographic implementation;
   sending a second message from a second message set to the cryptographic implementation after deciding to patch the cryptographic implementation, wherein the second message uses a second portion of the cryptographic implementation that is not used for any messages in the first message set.

2. The method of claim 1, wherein the first message uses the first portion of the cryptographic implementation that is not used for any messages not in the first message set and wherein the second message uses the second portion of the cryptographic implementation that is not used for any messages not in the second message set.

3. The method of claim 1, wherein messages from the second message set may use any portion of the first portion of the cryptographic implementation.

4. The method of claim 1, further comprising updating the cryptographic implementation with the second portion of the cryptographic implementation after deciding to patch the cryptographic implementation.

5. The method of claim 1, further comprising continuing to send messages from the first message set after deciding to patch the cryptographic implementation.

6. The method of claim 1, wherein deciding to patch the cryptographic implementation further includes receiving an indication that the cryptographic implementation has been copied.

7. The method of claim 1, wherein deciding to patch the cryptographic implementation occurs after a time period has expired.

8. The method of claim 1, wherein the cryptographic implementation includes a network of finite state machines.

9. The method of claim 1, wherein the cryptographic implementation includes a network of lookup tables.

10. The method of claim 1, wherein the cryptographic operation is one of advanced encryption system (AES) or data encryption standard (DES).

11. A method of producing a cryptographic implementation of a keyed cryptographic operation mapping an input message to an output message in a cryptographic system, wherein the cryptographic implementation is patchable without changing the cryptographic key, comprising:
   receiving information specifying a plurality of message groups;
   modifying the cryptographic implementation based upon the received information specifying the plurality of message groups so that:
      when a message from a first message set is received by the cryptographic implementation, the first message uses a first portion of the cryptographic implementation;
      when a second message from a second message set is received the cryptographic implementation after deciding to patch the cryptographic implementation, the second message uses a second portion of the cryptographic implementation that is not used for any messages in the first message set.

12. The method of claim 11, wherein the first message uses the first portion of the cryptographic implementation that is not used for any messages not in the first message set and wherein the second message uses the second portion of the cryptographic implementation that is not used for any messages not in the second message set.

13. The method of claim 11, wherein messages from the second message set may use any portion of the first portion of the cryptographic implementation.

14. The method of claim 11, wherein the cryptographic implementation is further modified to process messages from a first message group associated with a first portion of the cryptographic implementation, and the cryptographic implementation is configured to receive a second portion of the cryptographic implementation before messages from a second message group associated with the second portion of the cryptographic implementation are received.

15. The method of claim 11, wherein cryptographic implementation includes a plurality of functions, and modifying the cryptographic implementation so that:
   the output of a first function includes an indication that the input to the first function corresponds to a received input message that is in one of the plurality of the message groups; and
   based upon an indication that the input to the first function does correspond to a message in one of the plurality of the groups, using only a portion of a second function that corresponds to the message group associated the received input message.

16. The method of claim 11, wherein the cryptographic implementation includes a network of finite state machines.

17. The method of claim 11, wherein the cryptographic implementation includes a network of lookup tables.

18. The method of claim 11, wherein the cryptographic operation is one of advanced encryption system (AES) or data encryption standard (DES).

19. A method of mapping an input message to an output message in a cryptographic implementation of a keyed cryptographic operation in a cryptographic system, wherein the cryptographic implementation is patchable without changing the cryptographic key, comprising:
   receiving, by the cryptographic system, a first input message associated with a first message set, wherein the first message set is associated with a first portion of the cryptographic implementation;
   performing, by the cryptographic system, a keyed cryptographic operation mapping the first input message into a first output message, wherein the performing the mapping on the first input message uses the first portion of the cryptographic implementation;
   receiving, by the cryptographic system, a second input message associated with a second message set, wherein the second message set is associated with a second portion of the cryptographic implementation;
   performing, by the cryptographic system, a keyed cryptographic operation mapping the second input message into a second output message, wherein the performing the mapping on the second input message uses the second portion of the cryptographic implementation that is not used for any messages in the first message set.

20. The method of claim 19, wherein the first input message uses the first portion of the cryptographic implementation that is not used for any input messages not in the first message set and wherein the second input message uses the second portion of the cryptographic implementation that is not used for any input messages not in the second message set.

21. The method of claim 19, wherein input messages from the second message set may use any portion of the first portion of the cryptographic implementation.

22. The method of claim 19, further comprising before receiving the second input message receiving a second portion of the cryptographic implementation.

23. The method of claim 19, wherein
the cryptographic implementation includes a plurality of functions,
the output of a first function includes an indication that the input to the first function corresponds to a received second input message that is in the second message group, and
based upon an indication that the input to the first function does correspond to a received second input message in the second message group, using only a portion of a second function that corresponds to the second message group.

24. The method of claim 19, wherein the cryptographic implementation includes a network of finite state machines.

25. The method of claim 19, wherein the cryptographic implementation includes a network of lookup tables.

26. The method of claim 19, wherein the cryptographic operation is one of advanced encryption system (AES) or data encryption standard (DES).

27. A non-transitory machine-readable storage medium encoded with instructions for execution by a cryptographic implementation of a keyed cryptographic operation in a cryptographic system for mapping an input message to an output message, wherein the cryptographic implementation is patchable without changing the cryptographic key, the non-transitory machine-readable storage medium comprising:
instructions for receiving a first input message associated with a first message set, wherein the first message set is associated with a first portion of the cryptographic implementation;
instructions for performing a keyed cryptographic operation mapping the first input message into a first output message, wherein performing the mapping on the first input message uses the first portion of the cryptographic implementation;
instructions for receiving a second input message associated with a second message set, wherein the second message set is associated with a second portion of the cryptographic implementation;
instructions for performing a keyed cryptographic operation mapping the second input message into a second output message, wherein the performing the mapping on the second input message uses the second portion of the cryptographic implementation that is not used for any messages in the first message set.

28. The non-transitory machine-readable storage medium of claim 27, wherein the first input message uses the first portion of the cryptographic implementation that is not used for any input messages not in the first message set and wherein the second input message uses the second portion of the cryptographic implementation that is not used for any input messages not in the second message set.

29. The non-transitory machine-readable storage medium of claim 27, wherein input messages from the second message set may use any portion of the first portion of the cryptographic implementation.

30. The non-transitory machine-readable storage medium of claim 27, further comprising instructions for receiving a second portion of the cryptographic implementation before receiving the second input message.

31. The non-transitory machine-readable storage medium of claim 27, wherein
the cryptographic implementation includes a plurality of functions,
the output of a first function includes an indication that the input to the first function corresponds to a received second input message that is in the second message group, and
based upon an indication that the input to the first function does correspond to a received second input message in the second message group, using only a portion of a second function that corresponds to the second message group.

32. The non-transitory machine-readable storage medium of claim 27, wherein the cryptographic implementation includes a network of finite state machines.

33. The non-transitory machine-readable storage medium of claim 27, wherein the cryptographic implementation includes a network of lookup tables.

34. The non-transitory machine-readable storage medium of claim 27, wherein the cryptographic operation is one of advanced encryption system (AES) or data encryption standard (DES).

* * * * *